(12) United States Patent
Kang et al.

(10) Patent No.: US 8,799,314 B2
(45) Date of Patent: Aug. 5, 2014

(54) SYSTEM AND METHOD FOR MANAGING INFORMATION MAP

(75) Inventors: Seok Ho Kang, Seongnam-si (KR); Dohwan Kang, Seongnam-si (KR)

(73) Assignee: NHN Corporation, Gyeonggi-Do (KR)

( * ) Notice: Subject to any disclaimer, the term of this patent is extended or adjusted under 35 U.S.C. 154(b) by 402 days.

(21) Appl. No.: 12/680,691

(22) PCT Filed: Sep. 9, 2008

(86) PCT No.: PCT/KR2008/005310
§ 371 (c)(1),
(2), (4) Date: Mar. 29, 2010

(87) PCT Pub. No.: WO2009/054611
PCT Pub. Date: Apr. 30, 2009

(65) Prior Publication Data
US 2011/0264683 A1    Oct. 27, 2011

(30) Foreign Application Priority Data

Oct. 24, 2007    (KR) ........................ 10-2007-0107068

(51) Int. Cl.
*G06F 17/30*    (2006.01)

(52) U.S. Cl.
USPC ........................................................ 707/771

(58) Field of Classification Search
USPC ......... 707/705, 708, 758, 763, 768, 769, 771, 707/999.003, 999.004, 999.1, 791, 792, 707/793, 796, 798, 801–805, 807, E17.019, 707/E17.024, 915, 919, 920, 926, 999.006, 707/999.102, 999.107, 76, 4, 770
See application file for complete search history.

(56) References Cited

U.S. PATENT DOCUMENTS 6,018,760 A * 1/2000 Oishi et al. .................... 709/204
(Continued)

FOREIGN PATENT DOCUMENTS

JP    2002-373175    12/2002
JP    2004-310462    11/2004
(Continued)

OTHER PUBLICATIONS

Non-Final Office Action of U.S. Appl. No. 12/667,838 mailed on Oct. 31, 2011.

(Continued)

*Primary Examiner* — Greta Robinson
(74) *Attorney, Agent, or Firm* — Harness, Dickey & Pierce, P.L.C.

(57) ABSTRACT

An information map management system and method. The information map management system, including: an information map database maintaining at least one of an object, property, class, and group which are a unit of an information map; a search result determination unit determining a search result corresponding to a query by referring to the information map database, the query being inputted by a user; a count information generation unit generating count information about the unit using log information about the query; and a management unit managing the information map database using at least one of the log information about the query and the count information.

23 Claims, 4 Drawing Sheets

(56) References Cited

U.S. PATENT DOCUMENTS

| | | | |
|---|---|---|---|
| 6,691,114 B1* | 2/2004 | Nakamura | 1/1 |
| 7,275,063 B2 | 9/2007 | Horn | |
| 8,126,874 B2* | 2/2012 | Sercinoglu et al. | 707/721 |
| 2002/0169768 A1 | 11/2002 | Lowe et al. | |
| 2003/0233351 A1* | 12/2003 | Naeve et al. | 707/3 |
| 2004/0088287 A1* | 5/2004 | Elder et al. | 707/3 |
| 2006/0100999 A1* | 5/2006 | Sencaj et al. | 707/3 |
| 2006/0106824 A1 | 5/2006 | Stuhec | |
| 2006/0212432 A1 | 9/2006 | Tsai | |
| 2007/0038616 A1 | 2/2007 | Guha | |
| 2007/0061294 A1 | 3/2007 | Parnell et al. | |
| 2008/0082959 A1 | 4/2008 | Fowler | |
| 2008/0114745 A1 | 5/2008 | Gideoni et al. | |
| 2009/0024604 A1 | 1/2009 | Zhao et al. | |
| 2009/0157711 A1 | 6/2009 | Baer et al. | |
| 2011/0258173 A1* | 10/2011 | Ratiner et al. | 707/706 |

FOREIGN PATENT DOCUMENTS

| | | |
|---|---|---|
| JP | 2005-085172 | 3/2005 |
| KR | 1020010093775 | 10/2001 |
| KR | 10-2001-0108845 | 12/2001 |
| KR | 1020020090816 | 12/2002 |
| KR | 10-2006-0104544 | 10/2006 |
| KR | 1020040005913 | 1/2007 |
| WO | 00/19340 | 4/2000 |
| WO | 2006/014562 | 2/2006 |

OTHER PUBLICATIONS

Notice of Allowance issued on Apr. 11, 2012 in U.S. Appl. No. 12/667,838.

Co-pending U.S. Appl. No. 12/667,838, filed Jan. 5, 2010.

* cited by examiner

SYSTEM AND METHOD FOR MANAGING INFORMATION MAP

CROSS REFERENCE TO RELATED APPLICATIONS

This application is the National Stage of International Application No. PCT/KR2008/005310, filed Sep. 9, 2008, and claims priority from and the benefit of Korean Patent Application No. 10-2007-0107068, filed on Oct. 24, 2007, which are both hereby incorporated by reference for all purposes as if fully set forth herein.

BACKGROUND OF THE INVENTION

1. Field of the Invention

The present invention relates to an information map management system and method, and more particularly, to an information map management system and method which provides a user-oriented search result.

2. Discussion of the Background

Currently, along with the development of communication networks such as the Internet, information search using communication networks is widely used. Internet users may easily obtain desired information anytime and anywhere, and such information search changes peoples' lives.

Accordingly, a search service manager providing a search service to Internet users appears. A search service manager provides information associated with a query inputted by a user. Also, a search service manager builds a variety of information maps to retrieve desired information.

An integrated search system, one of information map structures, extracts information associated with a user's query from a database, and provides users with the extracted information for each database. The database is maintained according to types of information. However, an integrated search system may not satisfy a purpose of a user's query due to the database based on types of information. Also, a browsing structure, one of the information map structures, is based on classification of an editor, regardless of a purpose of a user's information search, and thereby may not satisfy a user's search goal.

Thus, an information map management system and method which builds an information map structure providing a search result close to a search goal, efficiently manages the information map, and thereby may retrieve information based on a user's search intention using the information map is required.

SUMMARY OF THE INVENTION

The present invention provides an information map management system and method which generates at least one of an object, property, class, and group, which are a unit of an information map, and thereby may provide a search result appropriate for a user's search intention.

The present invention also provides an information map management system and method which uses log information of a query, inputted according to an integrated search request, and thereby may efficiently ascertain a user's search intention.

The present invention also provides an information map management system and method which generates count information of a unit of an information map, and thereby may provide relatively objective data to ascertain a user's search intention.

The present invention also provides an information map management system and method which is more flexible for changes using information extracted from a user's query.

According to an aspect of the present invention, there is provided an information map management system, including: an information map database maintaining at least one of an object, property, class, and group which are a unit of an information map; a search result determination unit determining a search result corresponding to a query by referring to the information map database, the query being inputted by a user; a count information generation unit generating count information about the unit using log information about the query; and a management unit managing the information map database using at least one of the log information about the query and the count information.

In this instance, the search result determination unit may determine the search result corresponding to the query using a relationship among the object, property, class, and group of the information map.

In this instance, the count information generation unit includes: a query log information management unit managing the log information about the query; an object count generation unit generating count information about the object using the log information; and an object property count generation unit generating count information about the property using the log information, the property being related information about the object.

In this instance, the management unit may manage the unit of the information map using the log information about the query, and manage a relationship/priority of the unit of the information map using the count information.

In this instance, the information map management system may further include an input/output unit performing an input/output from/to an external device with respect to information associated with at least one of the object, property, class, group, query, and a relationship among the object, property, class, group, and query.

According to another aspect of the present invention, there is provided an information map management method, including: maintaining at least one of an object, property, class, and group which are unit of an information map; determining a search result corresponding to a query by referring to the information map database, the query being inputted by a user; generating count information about the unit using log information about the query; and managing the information map database using at least one of the log information about the query and the count information.

According to an embodiment of the present invention, an information map management system and method generates at least one of an object, property, class, and group, which are a unit of an information map, and thereby may provide a search result appropriate for a user's search intention.

Also, according to an embodiment of the present invention, an information map management system and method uses log information of a query, inputted according to an integrated search request, and thereby may efficiently ascertain a user's search intention.

Also, according to an embodiment of the present invention, an information map management system and method generates count information of a unit of an information map, and thereby may provide relatively objective data to ascertain a user's search intention.

Also, according to an embodiment of the present invention, an information map management system and method is more flexible for changes using information extracted from a user's query.

DETAILED DESCRIPTION OF THE ILLUSTRATED EMBODIMENTS

Hereinafter, embodiments of the present invention are described in detail by referring to the figures.

Figure 1:
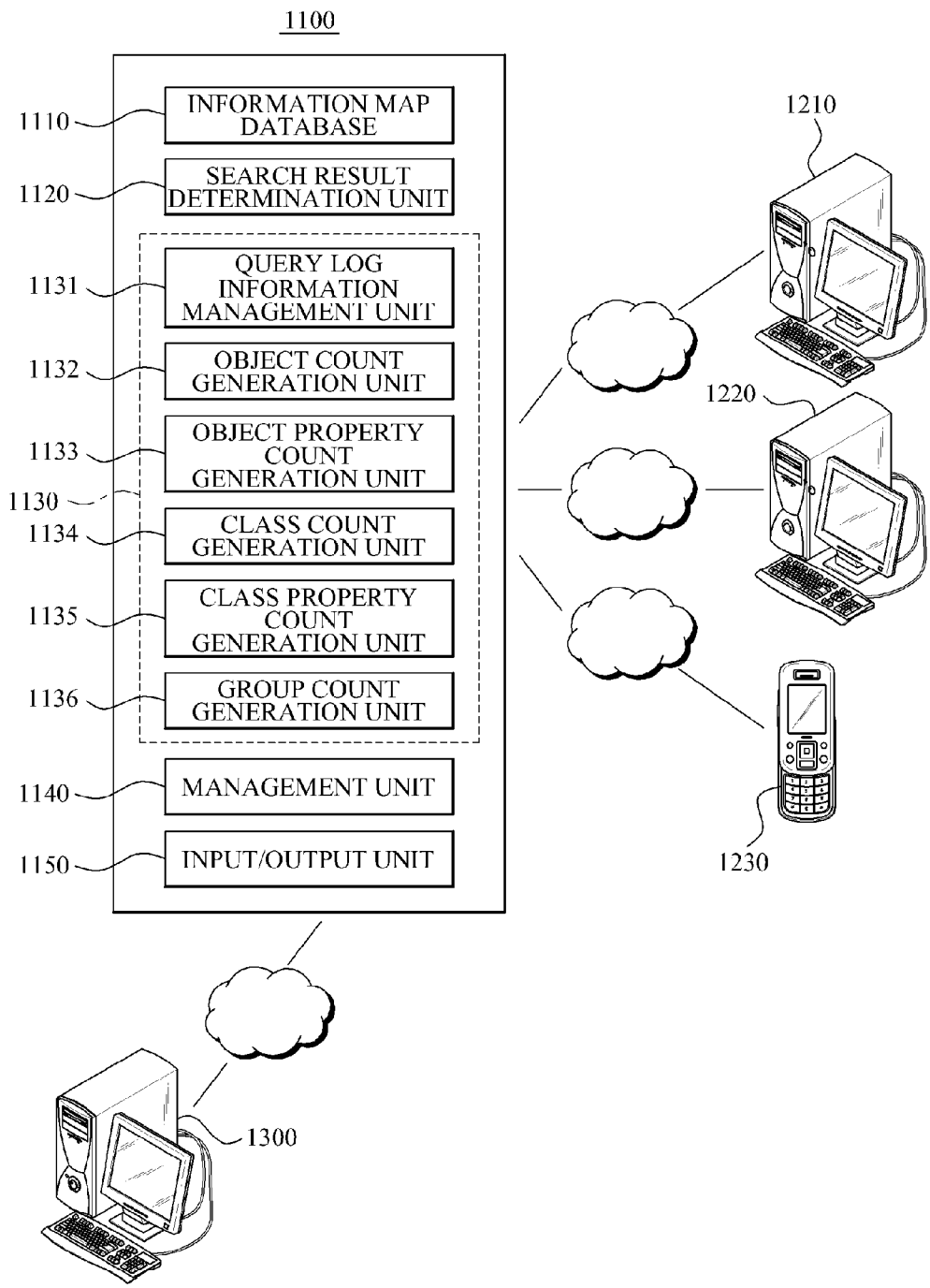
FIG. 1 is a block diagram illustrating a configuration of an information map management system according to an embodiment of the present invention.

FIG. 1 is a block diagram illustrating a configuration of an information map management system 1100 according to an embodiment of the present invention.

As illustrated in FIG. 1, the information map management system 1100 may include an information map database 1110, search result determination unit 1120, count information generation unit 1130, management unit 1140, and input/output unit 1150.

The information map database 1110 may maintain at least one of an object, property, class, and group which are a unit of an information map. In this instance, the object is an object of information as the unit of the information map, and the property is related information about the object. Also, each of the object and the property of the information map database 1110 may include a synonym.

According to an embodiment of the present invention, a user's query may include at least one of the object and the property. Also, a unit of information may include the object and the property. That is, a query received from a user may be represented as the object and the property, and a search result corresponding to the query may be represented as the object and the property. Also, the object and the property may be a classification unit of the information map. The information map management system 1100 may detect data with respect to each property as the search result.

Also, the object may be the object of the information. The property may be at least one of a specific attribute, contents, type, detailed information or source with respect to the object of the information. In this instance, the object may have at least one property. For example, an object "NHN" may have various properties such as "stock price", "location", "recruitment information", and the like. Also, each of the object and the property may be represented as at least one keyword. Also, each of the object and the property may include a synonym. For example, "NHN" and "엔에이치엔" of "NHN stocks" and "엔에이치엔 stocks" may be recognized as a keyword representing the same object. In this instance, '엔에이치엔' is 'NHN' in Korean. Similarly, "stock price" and "share price" of "NHN stock price" and "NHN share price" may be a keyword representing the same property.

Also, a keyword representing a property may include a keyword not associated with an object, and a keyword belonging to an object. For example, "latest single" and "hit song" in "HYORI latest single", "HYORI hit song", and "HYORI deeply" represent a property associated with "music" regardless of an object "HYORI". "deeply" is a song title of HYORI, and a keyword representing a property "music" with respect to only "HYORI".

The object may be generated using at least one of a query log analysis and a document analysis. Specifically, the query log analysis extracts a substantive word of the query from the log information about the query received from the user. When the extracted substantive word is not identical to the predetermined unit included in the information map, the query log analysis may generate the object through a representative word determination with respect to the substantive word. Otherwise, the query log analysis extracts a related search term of the object from the log information about the query. When a substantive word extracted from the related search term is not identical to the predetermined unit included in the information map, the query log analysis may generate the object through a representative word determination with respect to the substantive word.

In this instance, the substantive word may be included in the query. For example, when a query is "Maria of AJOONG", a substantive word may be "AJOONG". Also, when a query is "story of Miracle on first street", a substantive word may be "Miracle on first street".

Also, the substantive word of the query or related search term may be compared to each of the units included in the information map database 1110, to determine whether the substantive word is identical to the predetermined unit. Also, the representative word determination may be performed using reference information. For example, the reference information may be from an encyclopedia or biographical dictionary. Specifically, when the substantive word is a representative word not included in the information map database 1110, the information map management system 1100 registers the substantive word in the information map database 1110 as the object. When the substantive word is not a representative word, the information map management system 1100 retrieves and registers a representative word as the object. Also, the information map management system 1100 registers the substantive word as a synonym of the object. When a representative word of the substantive word is already registered as the object, the information map management system 1100 registers the substantive word as a synonym of the registered object.

The document analysis extracts a substantive word from object candidates extracted from a document automatically sorted according to a rule. When the extracted substantive word is not identical to the predetermined unit included in the information map, the document analysis may generate the object through a representative word determination with respect to the substantive word. The determining of the identity of the substantive word and the representative word determination have been described above, and thus a detailed description related thereto will be omitted.

The object may be generated according to a request from an administrator or the user. In this instance, the request may be made using a terminal connected to the input/output unit 1150. Also, the object may be generated in interoperation with internal and external databases.

The property may be generated using at least one of a query log analysis, click analysis, and document analysis. In this instance, the query log analysis extracts a prefix, suffix, and related search term of the object from the log information about the query. Also, the query log analysis may determine a generalization word of the extracted prefix, suffix, and related search term, and when the determined generalization word is not identical to the predetermined unit included in the information map, may generate the generalization word as the property of the object.

For example, "AJOONG homepage", "AJOONG Maria", "BYUL AJOONG", "AJOONG age", and "AJOONG height" are queries or related search terms related to the object "AJOONG", the information map management system 1100 may extract "BYUL" from the "BYUL AJOONG" as a prefix. Also, the information map management system 1100 may generalize "BYUL" as "song", and generate the "song" as a property of the object "AJOONG" after determining whether the generalization word is identical to the predetermined unit through the information map database 1110.

The click analysis determines a generalization word based on information about an area where a click with respect to the object occurs. When the determined generalization word is not identical to the predetermined unit included in the information map, the click analysis may generate the generalization word as the property of the object.

The document analysis determines a generalization word from property candidates extracted from a document related to the object. When the determined generalization word is not identical to the predetermined unit included in the information map, the document analysis may generate the generalization word as the property of the object. The generalization word and whether the generalization word is identical to the predetermined unit are determined in a same method as the click analysis, and thus a detailed description related thereto will be omitted.

The property may be generated by a request from the user or administrator. In this instance, the user or administrator may make the request using a terminal connected to the input/output unit 1150. Also, the property may be generated in interoperation with the internal/external databases.

The class may be a unit including at least one object grouped as a single group according to a classification standard. The group may be a unit including at least one of objects which are included in the class and grouped based on an identical standard. Also, the information map database 1110 may include a property of the class. The property of the class is determined based on a property related to the at least one object included in the class.

The information map management system 1100 may generate the class by grouping the at least one object into the single group according to the classification standard. Also, the information map management system 1100 may generate a set of objects having a common property from among the at least one object, as the class. For example, "NHN", "DAUM", and "YAHOO", each of which are objects, may be set as a class of "Internet portal company".

Also, the information map management system 1100 may generate the class by grouping objects classified based on the classification standard. For example, the information map management system 1100 collects objects grouped by a single classification standard, extracts a common part from all the collected objects, and performs generalization with respect to the common part. In this instance, the information map management system 1100 may generate a word, generated by the generalization, as the class having the property.

That is, the information map management system 1100 may generate the set of objects with the determined property as the class, and determine the common property of the objects of the class as the property related to the class. Also, the information map management system 1100 collects objects based on a standard, extracts a property from the collected objects, and thereby may generate a class using the property.

In this instance, the class may be represented as at least one keyword. Also, the objects included in the class may have a common property set. For example, a class of "singer" such as "HYORI", "RAIN", "CHAE-YEON", and the like, may have a common property such as "album", "official website", "latest single", and the like.

Also, a particular object may have a property different from that of another object included in an identical class. For example, although "HYORI", which is an object included in the class of "singer", may have a property of "phone", "RAIN", another object of the class of "singer", may not have the property of "phone", since "HYORI phone" exists but "RAIN phone" does not exist.

Also, the information map management system 1100 may determine a property related to the object using the objects included in the class. In this instance, the property related to the object may be a common property of the objects included in the class.

As described above, the information map management system 1100 may generate the property of the object, and generate the class using the object. Also, the information map management system 1100 may determine the common property of the objects included in the class, and determine the property of the class. Also, the information map management system 1100 may determine the common property by collecting the objects grouped by the identical classification standard, and thereby may generate the class using the common property. Accordingly, the object, property, and class have a relationship. The information map management system 1100 may provide an information search service appropriate for a user's purpose using each of the units in the information map structure.

The information map management system 1100 may generate the group by grouping at least one object included in the class based on an identical standard. That is, the group may be a set of the at least one object, which is grouped into the same standard, from among a plurality of objects included in the same class. For example, objects of a class of "Internet company" may be grouped into a group such as "game company", "search company", "community company", and the like. Also, a range of the group may be overlapped depending on the standard. For example, an object of a class of "university" may be grouped into a group such as "university around Seoul" and "provincial university" based on an area-related standard, or a group such as "four-year college" and "two-year college" based on a course-related standard.

The class or the group may be generated by a request from the administrator or the user. In this instance, the administrator or the user may make the request using the terminal connected to the input/output unit 1150. Also, the class or the group may be generated in interoperation with the internal/external databases.

Also, the information map management system 1100 may include a dummy class. In this instance, the dummy class may include an object which is not included in the class. According to an aspect of the present invention, the dummy class may include entire objects included in the information map database 1110.

The search result determination unit 1120 may determine a search result corresponding to a query by referring to the information map database 1110. The query is inputted by the user.

Specifically, the search result determination unit 1120 may determine the search result corresponding to the query using a relationship among the object, property, class, and the group of the information map.

The search result determination unit 1120 may receive the query including the object from the user. The query may include at least one of the object and the property. That is, the query may be represented as the object and the property. For example, the user may input a query of "엔에이치엔 share price", and the search result determination unit 1120 may determine a search result of "NHN stock price". In this instance, the search result determination unit 1120 may recognize "엔에이치엔" as the object and "share price" as the property, to analyze the query. Also, the search result determination unit 1120 may extract "NHN" recognized as an identical object to "엔에이치엔", "stock price" recognized as an identical property to "share price", and data associated with "stock price" as the search result.

Also, the user may input "엔에이치엔" as a query, and the search result determination unit 1120 may extract "NHN property", "NHN stock price", "NHN hot issues", and the like, as the search result. The search result determination unit 1120 may extract related information such as a class, subclass, object list, and property list, as the search result. The class includes an object included in the query.

Also, the search result determination unit 1120 may determine the search result corresponding to the query using at least one of the object, property, class, and the group. The search result determination unit 1120 may determine the search result corresponding to the query using a relationship among the object, property, class, and the group. For example, the user may input "엔에이치엔" as the query, and the search result determination unit 1120 may recognize "엔에이치엔" as the object. Also, the search result determination unit 1120 may extract a property with respect to the object of "엔에이치엔", and thereby may determine the search result. The search result may include specific data associated with the extracted property. The search result determination unit 1120 may determine all object lists of classes or groups including "엔에이치엔" as the search result.

The count information generation unit 1130 may generate count information about the unit using log information about the query. As illustrated in FIG. 1, the count information generation unit 1130 may include a query log information management unit 1131, object count generation unit 1132, object property count generation unit 1133, class count generation unit 1134, class property count generation unit 1135, and group count generation unit 1136.

The query log information management unit 1131 may manage the log information about the query inputted according to the request.

Specifically, the query log information management unit 1131 may include information associated with at least one query inputted by the user. For example, the query log information management unit 1131 may include information about a number of inputs of the query, a prefix of the query, a suffix of the query, a related search term, and a related click. Also, the query log information management unit 1131 may maintain a storage device or database that may internally store the information about the query.

According to an embodiment of the present invention, the information map management system 1100 may include a document analysis management unit or a search management unit which is not illustrated. The document analysis management unit may extract a candidate of the predetermined unit, that is, the object, property, class, and group, from a variety of documents online/offline. The search management unit may extract the candidate of the predetermined unit using search log information of the user.

The object count generation unit 1132 may generate count information about the object using the log information of the query.

Specifically, the object count generation unit 1132 may extract a number of inputs of a query from the log information to generate the count information about the object. The query is identical to a word including at least one of the object and a property related to the object.

As an example, the count information may be a Query Count (QC). That is, the count information may be determined based on the number of inputs of the query inputted by the user.

For example, to generate count information about a target object, the object count generation unit 1132 may extract a number of times that the object is inputted as the query, from the log information. The target object is an object to be evaluated. Also, the object count generation unit 1132 may extract a number of times that a word where the object and a related property are combined is inputted as the query. Accordingly, the object count generation unit 1132 may determine a value, obtained by summing all the extracted number of inputs, as the count information of the object. In this instance, the count information of the object may include count information of a synonym of the object.

Also, the object count generation unit 1132 may compare the count information of the object and count information of all objects managed by the information map management system 1100, and thereby may determine a ratio value. The ratio value may indicate an importance of the object.

The object property count generation unit 1133 may generate count information about the property using the log information. The property is related information about the object.

For example, the object property count generation unit 1133 may extract a number of inputs of a query from the log information to generate the count information about the property. The query is identical to a word including the property and an object related to the property.

When a target property itself is a general property, the object property count generation unit 1133 generates a number of inputs of a query, which is a word where the property and an object of the property are combined, as the count information of the property. The target property is a property to be evaluated. Conversely, when the target property is an individual property, the object property count generation unit 1133 may sum count information of the general property and the individual property based on both the general property and the individual property with respect to the target property in order to generate the count information of the target property. Also, the count information of the target property may include count information of a synonym.

The class count generation unit 1134 may generate count information about the class using the log information. The class includes at least one object grouped as a single group according to a classification standard. The count information about the class may be generated using a number of inputs of a query. The query is associated with at least one of an object, included in the class, and a property of the object included in the class.

For example, the class count generation unit 1134 may generate count information of a target class by summing count information of all objects included in the target class. The target class is a class to be evaluated. Also, the class count generation unit 1134 may generate the count information by summing count information of a word combining the objects included in the class and the property of the object included in the class. Also, the class count generation unit 1134 may generate the count information by summing count information of at least one of a property and an object included in the target class.

Also, the class count generation unit 1134 may compare the count information of the target class and count information of all classes managed by the information map management system 1100, and thereby may determine a ratio value. The ratio value may indicate a significance of the target class.

The class property count generation unit 1135 may generate count information about a property related to the class using the log information.

For example, the class property count generation unit 1135 may generate the count information about the property by summing count information of all words. In this instance, all the words are words generated by combining the property related to the class, and each of at least one object having the property of the class as its own property. The class property count generation unit 1135 may generate the count information by differentiating a general property from an individual property. The count information about the class is generated in a same method as the generating of the count information about the property using the object property count generation unit 1133, and thus a detailed description will be omitted. The count information of the class may include count information of a synonym.

The group count generation unit 1136 may generate count information about the group using the log information. The group includes at least one of objects included in the class and grouped based on an identical standard. The count information about the group may be generated using a number of inputs of a query. The query is associated with at least one of an object, included in the group, and a property of the object included in the group.

For example, the group count generation unit 1136 may generate count information about a target group by summing count information of all objects included in the target group. The target group is a group to be evaluated. Also, the group count generation unit 1136 may generate the count information by summing count information of a word combining the object included in the target group and property of the object. Also, the group count generation unit 1136 may generate the count information by summing count information of at least one of the object and the property included in the target group.

Also, the group count generation unit 1136 may compare the count information of the target group and count information of all groups managed by the information map management system 1100, and thereby may determine a ratio value. The ratio value may indicate a significance of the target group.

The management unit 1140 may manage the information map database 1110 using at least one of the log information about the query and the count information.

Specifically, the management unit 1140 may manage the predetermined unit of the information map using the log information about the query, and manage a relationship/priority of the predetermined unit of the information map using the count information.

For example, the management unit 1140 may include at least one of a new object, new property, new class, and new group using the log information about the query.

Also, the management unit 1140 may change the relationship of the predetermined unit using the count information of each of the object, property, class, and group. Also, the management unit 114 may change the priority of the predetermined unit using the count information. For example, the management unit 114 may change a priority of the object of the class using the count information, and change a priority of each of at least one property associated with the object. In this instance, the priority may indicate a priority of exposing the search result corresponding to the query inputted by the user. Also, the management unit 1140 may store the count information of the predetermined unit in the information map database 1110.

The input/output unit 1150 may perform an input/output from/to an external device with respect to information associated with at least one of the object, property, class, group, query, and the relationship among the object, property, class, group, and query.

For example, the input/output unit 1150 may receive information about the predetermined unit from an administrator's terminal 1300 or a user's terminal 1210, 1220, or 1230. The information may be associated with insertion/deletion of the predetermined unit itself, and be count information of the predetermined unit. Also, the information may enable the relationship among the object, property, class, and group included in the predetermined unit to change.

Also, the input/output unit 1150 may receive the information from the internal/external databases. Also, the input/output unit 1150 may receive a previously built information map from the internal/external databases, and the information map may be reflected in the information map database 1110.

Also, the input/output unit 1150 may transmit information, managed by the information map management system 1100, to the user's terminal 1210, 1220, or 1230, the administrator's terminal 1300, or the internal/external databases. Also, the input/output unit 1150 may display the information, managed by the information map management system 1100, using a display device.

The input/output unit 1150 is described in greater detail with reference to FIG. 3.

Figure 2:
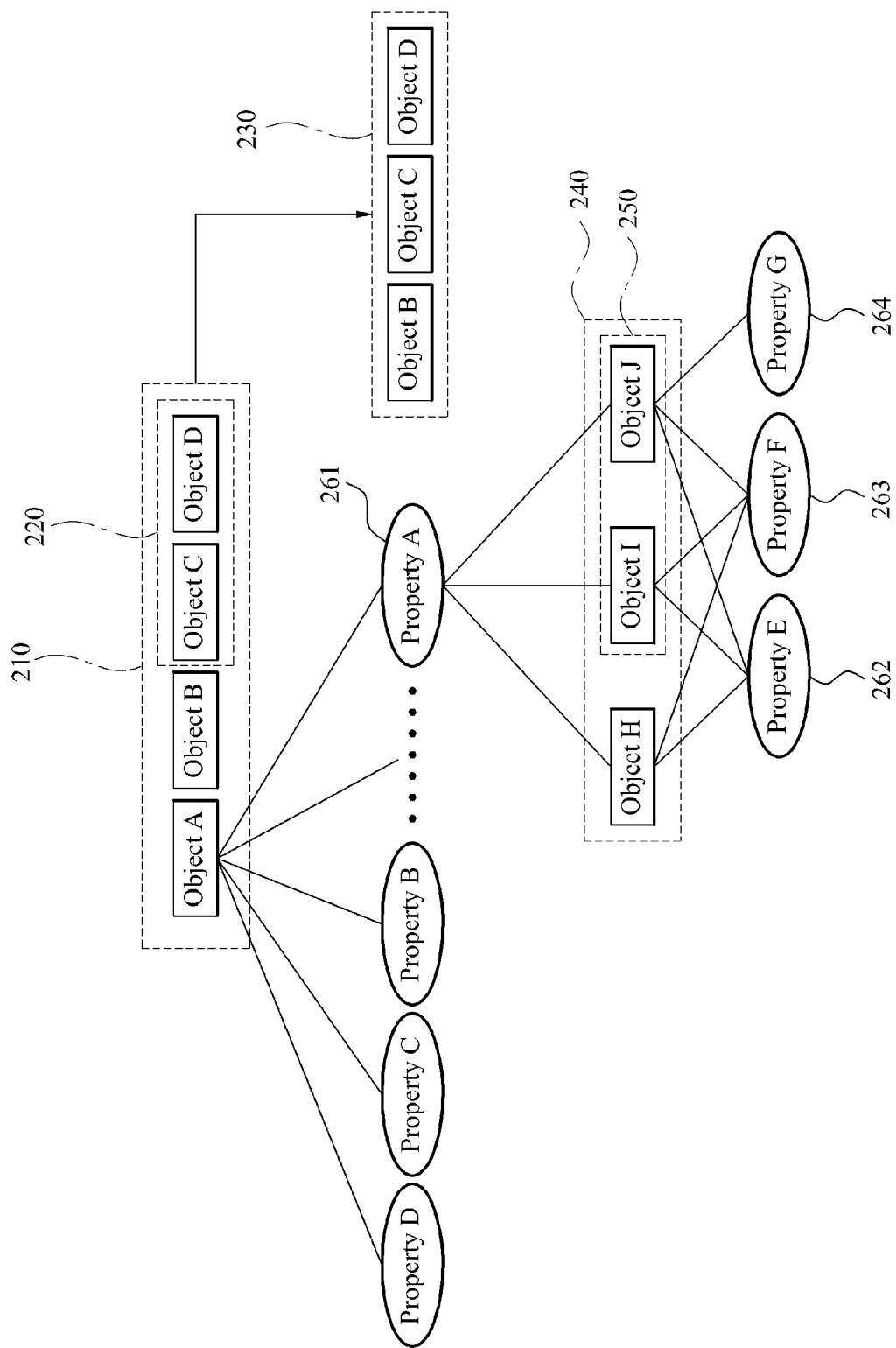
FIG. 2 is a diagram illustrating a relationship of an object, property, class, and group according to an embodiment of the present invention.

FIG. 2 is a diagram illustrating a relationship of an object, property, class, and group according to an embodiment of the present invention.

Referring to FIG. 2, an object A may include at least one property. The object A, an object B, an object C, and an object D may be included in a single class 210. An information map management system according to an embodiment of the present invention may group the objects included in the class 210 based on a classification standard, and thereby may generate a group 220. Also, the information map management system may generate a subclass 230 including a property of the class 210 and an additional property. The subclass 230 may be a subordinate concept of the class 210.

A property A 261 is a property of the object A. The property A 261 may be a common property of an object H, object I, and object J. A class 240 includes the object H, object I, and object J. The property A 261, a property E 262, and a property F 263 may be a property of the class 240. Specifically, the property A 261, the property E 262, and the property F 263 may be a common property of the class 240. The object J may include a property G which is not associated with the object H and the object I included in the class 240. The class 240 may include a group 250.

For example, when the object A is "mp3", the object A may have a variety of properties such as "download", "review", "price comparison", "model", and the like. The property "model" may be a common property with respect to another object such as "IPOD", "IPOD SHUFFLE", "IRIVER U 10", and the like. The objects "IPOD", "IPOD SHUFFLE", and "IRIVER U 10" may be included in a single class. The single class may have a common property such as "review", "price comparison", "model", and the like.

Figure 3:
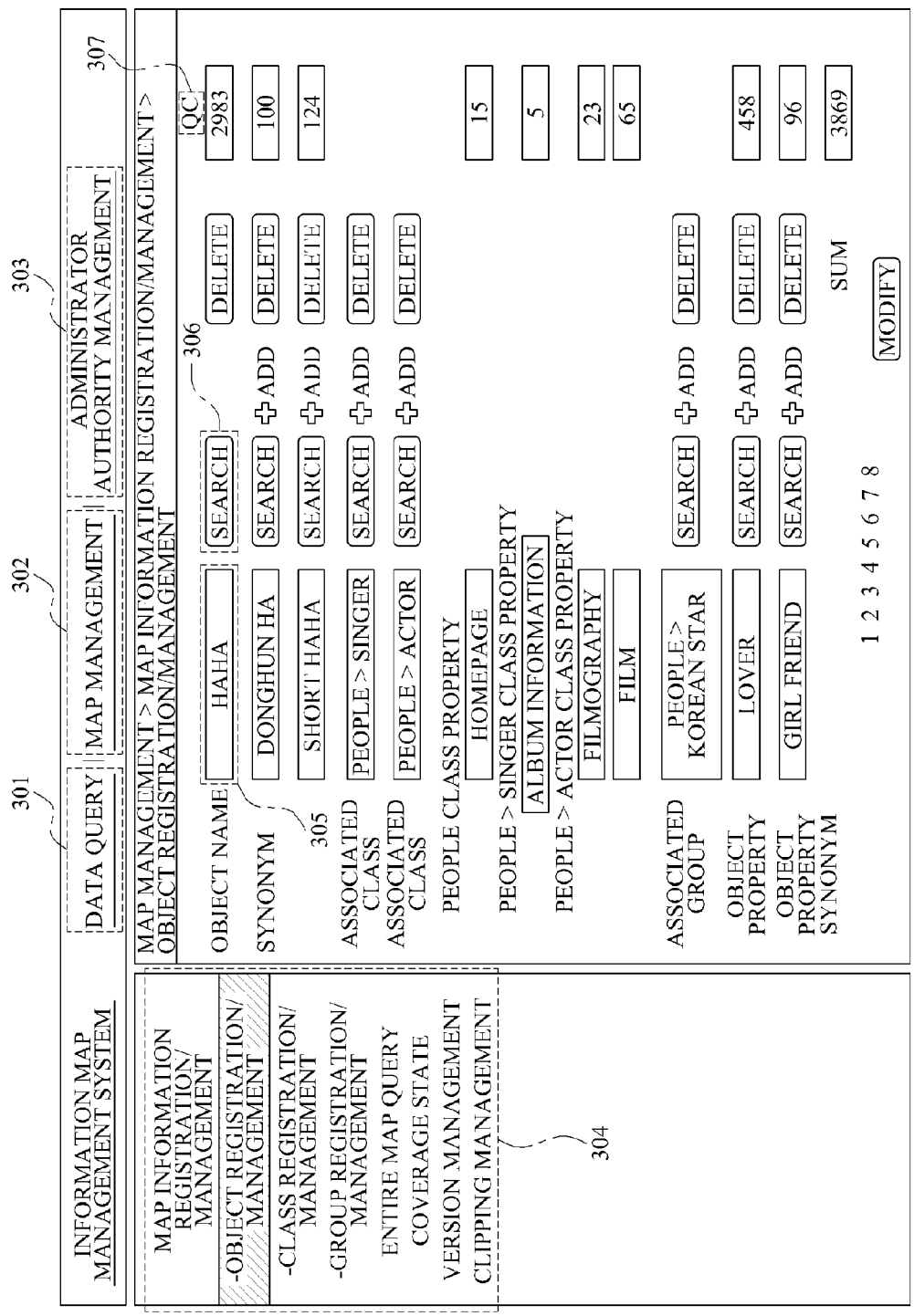
FIG. 3 is a diagram illustrating an example of a screen displayed on an administrator's terminal according to an embodiment of the present invention.

FIG. 3 is a diagram illustrating an example of a screen displayed on an administrator's terminal according to an embodiment of the present invention.

A screen illustrated in FIG. 3 may be an example of a screen of a predetermined display device connected to an input/output unit 1150 or an example of a display screen of an administrator's terminal connected to the input/output unit 1150. The input/output unit 1150 may provide query and update services with respect to information displayed on the screen through an interface device.

According to an embodiment of the present invention, the screen of FIG. 3 may be a screen of an interface browser provided by an information map management system to the administrator's terminal. The information map management system may receive a data query request 301 from the administrator's terminal. Data associated with the information map management system is requested through the data query request 301. The information map management system may expose data associated with an information map in response to the data query request 301. For example, the data may be at least one of information associated with an addition/deletion/modification of a predetermined unit, information about management of a relationship of the predetermined unit, count information of the predetermined unit, information about a query, information about an extended query, information about a related search term, click information, Uniform Resource Locator (URL) information, and document information.

The information map management system may receive a map management request 302 from the administrator's terminal. The map management request 302 is associated with the information map of the information map management system. Also, the information map management system may transmit menu information 304 to the administrator's terminal in response to the map management request 302. The menu information 304 includes a map information registration/management, entire map query, coverage state, version management, and clipping management.

In this instance, the information map management system may transmit/receive information from/to the administrator's terminal in response to a request for the map information registration/management. The information is associated with registration/management of at least one of the object, property, class, and group.

For example, the information map management system receives information about an object 305 from the administrator's terminal, and may provide the administrator's terminal with at least one of information about a synonym of the object 305, information about a class including the object 305, property information of the class, property information of the object 305, information about a group including the object 305, and count information 307 of each of the units. In this instance, the information map management system may receive the information about the object 305 in response to a search request 306 from an administrator. Also, the information map management system may receive a request for registration/management of the information, provided to the administrator's terminal, from the administrator's terminal.

Also, the information map management system may provide the administrator's terminal with the information, included in the information map of the information map management system, in response to a request for the entire map query. The request for the entire map query is received from the administrator's terminal. The information map management system may provide the administrator's terminal with object information included in a dummy class in response to a dummy information query. The request for the dummy information query is received from the administrator's terminal.

Also, the information map management system may provide the administrator's terminal with count information based on a keyword in response to a request for a map count information view. The request for the map count information view is received from the administrator's terminal. In this instance, the count information may be information summed for a predetermined period of time. Also, the information map management system may provide a graph of the count information.

Also, the information map management system may provide the administrator's terminal with map keyword coverage information or map count information coverage information in response to a request for the coverage state. The request for the coverage state is received from the administrator's terminal. In this instance, the map keyword coverage information may include keyword ranking information, map information, and keyword coverage information. The keyword coverage information may be determined by the keyword ranking information and the map information. Also, the map count information coverage information may include the keyword ranking information, keyword count information, map information, map count information, and count coverage information. Also, the count coverage information may be determined by the keyword count information and map count information.

Also, the information map management system may provide the administrator's terminal with a backup file of the information map in response to a request for the version management. The request for the version management is received from the administrator's terminal. Also, the information map management system may provide the administrator's terminal with a set page in response to a request for the clipping management. The request for the clipping management is received from the administrator's terminal, and the set page enables subscription of a change of the map information.

Also, the information map management system may provide the administrator's terminal with a set page in response to a request for administrator authority management 303. The request for the administrator authority management 303 is received from the administrator's terminal. The set page enables authority management of the information map to be set.

Figure 4:
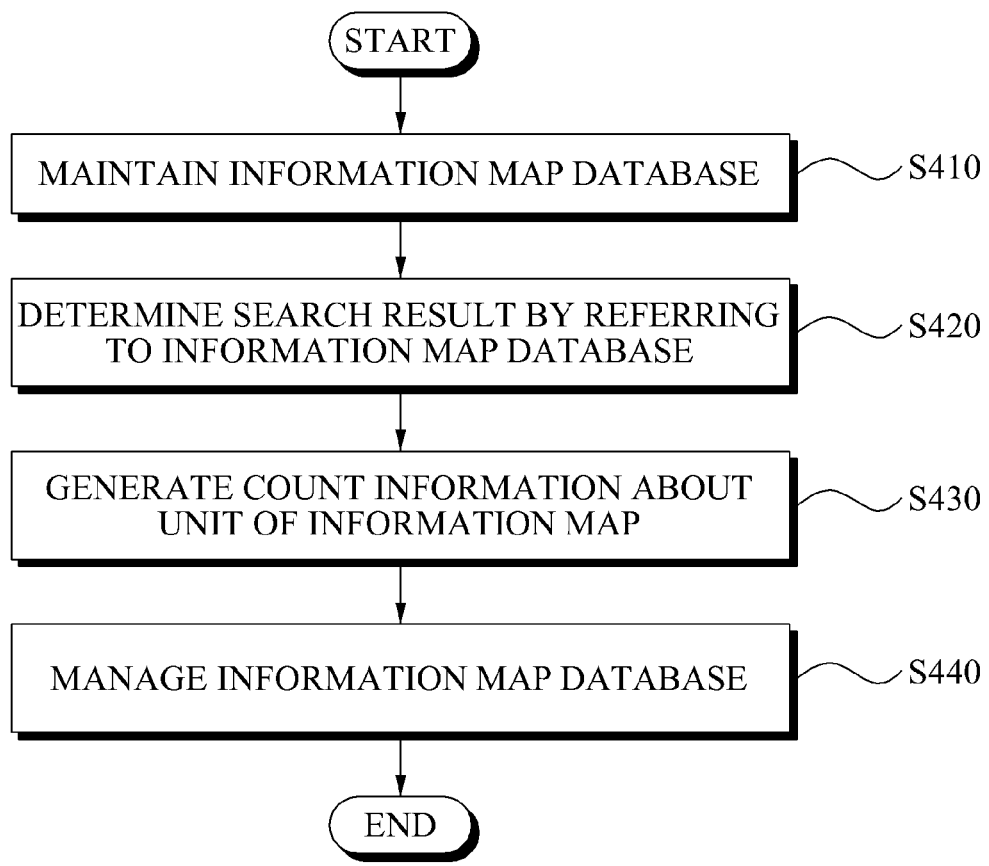
FIG. 4 is a flowchart illustrating an information map management method according to an embodiment of the present invention.

FIG. 4 is a flowchart illustrating an information map management method according to an embodiment of the present invention.

As illustrated in FIG. 4, the information map management method may be performed in operation S410 through operation S440. The information map management method may be performed by an information map management system.

In operation S410, the information map management system may maintain an information map database including at least one of an object, property, class, and group which are unit of an information map.

The object may be an object of information as the unit of the information map, and be generated using at least one of a query log analysis and a document analysis.

In this instance, the query log analysis extracts a substantive word of a query from log information about the query. The query is received from the user. When the extracted substantive word is not identical to the predetermined unit included in the information map, the query log analysis generates the object through a representative word determination with respect to the substantive word. Otherwise, the query log analysis extracts a related search term of the object from the log information about the query. When a substantive word extracted from the related search term is not identical to the predetermined unit included in the information map, the query log analysis generates the object through a representative word determination with respect to the substantive word.

The document analysis extracts a substantive word from object candidates extracted from a document. The document is automatically sorted according to a rule. When the extracted substantive word is not identical to the predetermined unit included in the information map, the document analysis generates the object through a representative word determination with respect to the substantive word.

The property may be related information about the object, and be generated using at least one of a query log analysis, click analysis, and document analysis.

The query log analysis extracts a prefix, suffix, and related search term of the object from the log information about the query, and determines a generalization word of the extracted prefix, suffix, and related search term. When the determined generalization word is not identical to the predetermined unit included in the information map, the query log analysis generates the generalization word as the property of the object.

The click analysis determines a generalization word based on information about an area where a click with respect to the object occurs. When the determined generalization word is not identical to the predetermined unit included in the information map, the click analysis generates the generalization word as the property of the object.

Also, the document analysis determines a generalization word from property candidates extracted from a document related to the object. When the determined generalization word is not identical to the predetermined unit included in the information map, the document analysis generates the generalization word as the property of the object.

The class may be a unit including at least one object grouped as a single group according to a classification standard. The group may be a unit including at least one of objects which are included in the class and grouped based on an identical standard.

Also, the information map database may include a property of the class. The property of the class is determined based on a property related to the object included in the class. The information map database may include a dummy class.

In operation S420, the information map management system may determine a search result corresponding to the query by referring to the information map database. The query is inputted by a user.

Specifically, the information map management system may determine the search result corresponding to the query, using a relationship among the object, property, class, and group of the information map.

In operation S430, the information map management system may generate count information about the unit using log information about the query.

Although it is not illustrated in FIG. 4, the generating in operation S430 may include an operation of managing the log information about the query, an operation of generating count information about the object using the log information, an operation of generating count information about the property using the log information. The property is related information about the object. Also, the generating in operation S430 may include an operation of generating count information about the class using the log information, an operation of generating count information about a property related to the class using the log information, and an operation of generating count information about the group using the log information. The class includes at least one object grouped as a single group according to a classification standard, and the group includes at least one of objects which are included in the class and grouped based on an identical standard.

In this instance, the information map management system may extract a number of inputs of a query from the log information to generate the count information about the object. The query is identical to a word including at least one of the object and a property related to the object. Also, the information map management system may extract a number of inputs of a query from the log information to generate the count information about the property. The query is identical to a word including the property and an object related to the property.

Also, the information map management system may generate the count information about the class using a number of inputs of a query. The query is associated with at least one of an object included in the class and a property of the object included in the class. The information map management system may generate the count information about the group using a number of inputs of a query. The query is associated with at least one of an object included in the group and a property of the object included in the group.

In operation S440, the information map management system may manage the information map database using at least one of the log information about the query and the count information.

Specifically, in the managing in operation S440, the information map management system may manage the unit of the information map using the log information about the query, and manage a relationship/priority of the unit of the information map using the count information.

Although it is not illustrated in FIG. 4, the information map management system may perform an input/output from/to an external device with respect to information associated with at least one of the object, property, class, group, query, and a relationship among the object, property, class, group, and query.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An information map management system, the system comprising:
   an information map database to maintain an information map for providing a search result corresponding to a query, the information map being classified as an object, a property, a class, or a group by performing a query log analysis or a document analysis, the query being determined by the object, the property, the class, or the group;
a search result determination unit to determine a search result corresponding to the query by referring to the information map database;
a count information generation unit to generate count information of the classified object, property, class, or the group by using log information of the query, the log information comprising a number of inputs of the query, a prefix of the query, a suffix of the query, a related search term of the query, and a number of clicks related to the query, wherein a ratio value is determined based on the count information, the ratio value specifying a relationship and a priority of the object, the property, and the group; and
a management unit to manage the information map database using the log information of the query, the count information, or both the log information of the query and the count information,
wherein the search result determination unit is configured to determine the search result corresponding to the query using the relationship and the priority among at least two of the object, the property, the class, or the group.

2. The information map management system of claim 1, wherein the object comprises information corresponding to the query, and the property comprises related information of the object.

3. The information map management system of claim 2, wherein the object is generated using a query log analysis, a document analysis, or both the query log analysis and the document analysis.

4. The information map management system of claim 3, wherein the query log analysis is performed to extract a substantive word of the query from the log information of the query transmitted from a user terminal, and in response to detection of the extracted substantive word being not identical to the predetermined unit of the information map, to generate the object by determining a representative word from the substantive word,
the query log analysis is performed to extract a related search term of the object from the log information of the query, and in response to detection of a substantive word extracted from the related search term being not identical to the predetermined unit of the information map, to generate the object by determining a representative word from the substantive word, and
the document analysis is performed to extract a substantive word from object candidates extracted from a document automatically sorted according to a rule, and in response to detection of the extracted substantive word being not identical to the predetermined unit of the information map, to generate the object by determining a representative word from the substantive word.

5. The information map management system of claim 2, wherein the property is generated using a query log analysis, click analysis, document analysis, or any combination thereof, the property being a property of the object.

6. The information map management system of claim 5, wherein
the query log analysis comprises to extract a prefix, a suffix, and a related search term of the object from the log information of the query, to determine a first generalization word of the prefix, the suffix, and the related search term, and in response to detection of the first generalization word not being identical to any of the information map, to generate the first generalization word as the property of the object,
the click analysis comprises to determine a second generalization word based on information in response to detection of a click with respect to the object, and, in response to a determination that the second generalization word not being identical to any of the information map, to generate the second generalization word as the property of the object, and
the document analysis comprises to determine a third generalization word from property candidates extracted from a document related to the object, and, in response to a determination that the third generalization word not being identical to any of the information map, to generate the third generalization word as the property of the object.

7. The information map management system of claim 1, wherein the class comprises at least one object grouped as a single group according to a classification standard.

8. The information map management system of claim 1, wherein the information map database comprises a property of the class, the property of the class being determined based on a property related to the at least one object of the class.

9. The information map management system of claim 7, wherein the information map database comprises a dummy class.

10. The information map management system of claim 1, wherein the count information generation unit comprises:
a query log information management unit to manage the log information of the query;
an object count generation unit to generate count information of the object using the log information of the query; and
an object property count generation unit to generate count information of the property using the log information of the query, the property being related information of the object.

11. The information map management system of claim 10, wherein the count information generation unit further comprises:
a class count generation unit to generate count information of the class using the log information of the query, the class comprising at least one object grouped as a single group according to a classification standard; and
a class property count generation unit to generate count information of a property related to the class using the log information of the query.

12. The information map management system of claim 11, wherein the count information generation unit further comprises:
a group count generation unit to generate count information of the group using the log information of the query, the group comprising at least one object of the class and grouped based on an identical standard.

13. The information map management system of claim 12, wherein the count information of the class is generated using a number of inputs of a third query, the third query being associated with at least one of an object included in the class, or a property of the object of the class, and wherein the count information of the group is generated using a number of inputs of a fourth query, the fourth query being associated with at least one of an object included in the group, or a property of the object of the group.

14. The information map management system of claim 10, wherein the object count generation unit is configured to extract a number of inputs of a first query, the first query being identical to a word comprising at least one of the object or a property related to the object, from log information of the first query to generate the count information of the object, and wherein the object property count generation unit is configured to extract a number of inputs of a second query, the second query being identical to a word comprising the property and an object related to the property, from log information of the second query to generate the count information about the property.

15. The information map management system of claim 1, wherein the management unit is configured to manage the information map database using the log information of the query, and to manage a relationship among the information map using the count information.

16. The information map management system of claim 1, further comprising:
an input/output unit configured to perform an input from an external device and an output to the external device with respect to information associated with at least one of the object, the property, the class, the group, the query, or a relationship among the object, the property, the class, the group, and the query.

17. An information map management method that utilizes a processor, the method comprising:
maintaining an information map, by storing the information map for providing a search result corresponding to a query to an information map database, a classification unit of the information map being classified as an object, a property, a class, or a group by performing a query log analysis or a document analysis, the query being determined by the object, the property, the class, or the group;
generating count information of the classified object, property, class, or the group by using log information of the query, the log information comprising a number of inputs of the query, a prefix of the query, a suffix of the query, a related search term of the query, and a number of clicks related to the query, wherein a ratio value is determined based on the count information, the ratio value specifying a relationship and a priority of the object, the property, and the group; and
managing the information map database using the relationship and the priority among at least two of the object, the property, the class, or the group.

18. The information map management method of claim 17, wherein the object comprises information, the property comprises related information of the object, the class comprises at least one object grouped as a single group according to a classification standard.

19. The information map management method of claim 18, wherein the object is generated using at least one of a query log analysis or a document analysis, and the property is generated using at least one of a click analysis, query log analysis, or document analysis, the property being a property of the object.

20. The information map management method of claim 17, wherein generating count information comprises:
managing the log information of the query;
generating count information of the object using the log information of the query;
generating count information of the property using the log information of the query, the property being related information of the object;
generating count information of the class using the log information of the query, the class comprising at least one object grouped as a single group according to a classification standard;
generating count information of a property related to the class using the log information of the query; and
generating count information of the group using the log information of the query, the group comprising at least one object of the class and grouped based on an identical standard.

21. The information map management method of claim 20, wherein:
generating count information of the object comprises extracting a number of inputs of a first query, the first query being identical to a word comprising at least one of the object or a property related to the object, from log information of the first query to generate the count information of the object;
the generating of the count information of the property comprises extracting a number of inputs of a second query, the second query being identical to a word comprising the property and an object related to the property, from log information of the second query to generate the count information of the property;
the count information of the class is generated using a number of inputs of a third query, the third query being associated with at least one of an object included in the class or a property of the object of the class; and
the count information of the group is generated using a number of inputs of a fourth query, the fourth query being associated with at least one of an object of the group, and a property of the object of the group.

22. The information map management method of claim 17, wherein managing the information map database comprises using the log information of the query, and managing a relationship among the information map using the count information.

23. A non-transitory computer-readable medium comprising an executable program which, when executed, performs the steps of:
maintaining an information map, by storing the information map for providing a search result corresponding to a query to an information map database, a classification unit of the information map being classified as an object, a property, a class, or a group by performing a query log analysis or a document analysis, the query being determined by the object, the property, the class, or the group;
generating count information of the classified object, property, class, or the group by using log information of the query, the log information comprising a number of inputs of the query, a prefix of the query, a suffix of the query, a related search term of the query, and a number of clicks related to query, wherein a ratio value is determined based on the count information, the ratio value specifying a relationship and a priority of the object, the property, and the group; and
managing the information map database using the relationship and the priority among at least two of the object, the property, the class, or the group.

* * * * *